(12) United States Patent
Konstadinidis et al.

(10) Patent No.: US 7,431,963 B2
(45) Date of Patent: Oct. 7, 2008

(54) OPTICAL FIBER CABLES FOR MICRODUCT INSTALLATIONS

(75) Inventors: Kariofilis Konstadinidis, Decatur, GA (US); John M. Turnipseed, Lilburn, GA (US); Peter A. Weimann, Atlanta, GA (US)

(73) Assignee: Furukawa Electric North America, Inc., Norcross, GA (US)

( * ) Notice: Subject to any disclaimer, the term of this patent is extended or adjusted under 35 U.S.C. 154(b) by 514 days.

(21) Appl. No.: 11/090,984

(22) Filed: Mar. 8, 2005

(65) Prior Publication Data

US 2005/0184411 A1    Aug. 25, 2005

Related U.S. Application Data

(63) Continuation of application No. 10/233,719, filed on Sep. 3, 2002, now abandoned.

(51) Int. Cl.
*B32B 37/00* (2006.01)

(52) U.S. Cl. .............. 427/163.2; 156/166; 156/180; 427/162; 427/434.2; 427/434.6; 427/434.7

(58) Field of Classification Search .......... 156/166, 156/180; 427/162, 163.2, 180, 434.2, 434.6, 427/434.7
See application file for complete search history.

(56) References Cited

U.S. PATENT DOCUMENTS

| 5,533,164 | A  | * | 7/1996 | Preston et al. ............... 385/128 |
| 5,555,335 | A  | * | 9/1996 | Barker et al. ................ 385/100 |
| 6,404,962 | B1 | * | 6/2002 | Hardwick, III et al. ....... 385/114 |
| 6,415,090 | B1 | * | 7/2002 | Taylor et al. ................. 385/128 |

FOREIGN PATENT DOCUMENTS

| EP | 1085356 A2 | * | 3/2001 |
| EP | 1205777 A2 | * | 5/2002 |

* cited by examiner

*Primary Examiner*—Jeff H Aftergut
(74) *Attorney, Agent, or Firm*—Peter V. D. Wilde

(57) ABSTRACT

The specification describes optical fiber cables designed for microduct installations. The microduct cables are coated with a sheath having particulates added to modify the drag of the outer surface of the cable to air, and thereby facilitate air blown installation. The particulates are nanoclay, silica, alumina, or other suitable solid particles of less than 5 microns. The coating comprises a prepolymer containing the filler, and is UV cured.

11 Claims, 4 Drawing Sheets

OPTICAL FIBER CABLES FOR MICRODUCT INSTALLATIONS

RELATED APPLICATIONS

This application is a continuation of U.S. application Ser. No. 10/233,719, filed Sep. 3, 2002, now abandoned.

FIELD OF THE INVENTION

This invention relates to polymer coatings for optical fiber cables, and to multi-fiber cables designed for installation in microducts. More specifically it relates to microduct cable specially adapted for air blown installation.

BACKGROUND OF THE INVENTION

Air blown fiber systems are now available as an alternative to conventional fiber optic cabling systems. These systems are designed to save space and time, and to facilitate system design changes. In an air blown fiber installation, the optical fiber medium is propelled through a pre-installed cable tube by a viscous air flow. Using this technique, the optical fiber medium is mechanically "pushed" into the duct concurrently with a stream of air, with the net force distributed along the fiber length rather than pulled from one end. Advantages in addition to simplicity and flexibility are that fiber breaks or excessive stress are minimized.

In a typical installation, the cable installation route comprises a "highway" of individual inner sub-ducts bundled inside a protective outer duct. A variety of duct styles is used, adapted specifically for use in plenum, riser, general purpose and outdoor applications. The inner sub-ducts may be small, e.g. 0.25 inch diameter, and up to two inches for large, high fiber count, cables. This description will refer to these inner ducts as microducts, and to the assembly of microducts as microduct conduit.

The optical fiber medium that is installed in the microducts may comprise a single optical fiber, or small bundles typically with 2-24 optical fibers. In assemblies with, for example, 3-8 optical fibers, the fibers may be arrayed in a regular geometric pattern comprising a tape or ribbon. For high capacity systems, the optical fiber medium may comprise stacked fiber ribbons in a round or oval bundle. In all these cases the optical fiber medium should have physical characteristics that make it suitable for installation in microducts. Accordingly, in this description the assembly of optical fibers will be referred to as microduct cable.

The individual optical fibers for the microduct cable are provided with conventional primary and secondary optical fiber coatings. The assembly of optical fibers is collectively coated with an outer sheath to form the microduct cable.

In the preferred case, installation of microduct cable in microduct is achieved using air blowing techniques. Success of optical fiber air blown installations depends on several conditions such as, diameter of the microduct cable, diameter of the microduct, friction characteristics of materials of the microduct, air flow rate, air pressure, amount of vertical rise, tube obstructions, tube discontinuities, etc. Especially important in this context are the properties of the microduct cable coating, in particular the frictional characteristics of the material forming the sheath. It is desirable to have a low friction surface to allow the microduct cable to easily slide within the microduct. However, at the same time it is desirable to have sufficient roughness at the sheath surface to provide enough dynamic air drag for the air stream to convey the microduct cable through the microduct. These requirements suggest a delicate design balance for the surface friction of the sheath covering microduct cable. To first order, the friction characteristics of the tube microduct cable sheath depend on the surface roughness of the sheath. The effect of the force of the air flow on the microduct cable sheath also depends on the aerodynamic properties of the surface. In some case that surface is shaped to provide more effective movement of the microduct cable through the microduct. However, the surface roughness of the sheath is still a dominant factor. Microduct cable sheath materials are polymers, which typically give very smooth surfaces. Proposals have been made to modify the surface by adding solid particulates to the polymer. See for example, U.S. Pat. Nos. 5,533,164; 5,851,450. These have met with limited success because they tend to adversely affect other mechanical properties of the microduct cable.

Solid particulates have been added to the outer jacket of extruded optical fiber cable. See for example, U.S. Pat. No. 6,324,324. However, improved cable designs are still sought.

SUMMARY OF THE INVENTION

We have designed new microduct cable for air blown installations wherein the surface characteristics of the microduct cable sheath material are modified desirably without significant impairment in the strength and toughness of the sheath. The new sheath material is a UV cured resin with a micro-particle filler. The sheath material is similar to that described and claimed in U.S. Pat. No. 6,415,090, in which the preferred filler is a nanoclay filler of naturally occurring clay particles with a plate-like morphology, and very small overall dimensions. The sheath is produced by coating the assembled fibers with a liquid prepolymer containing the micro-particle filler, and curing the prepolymer with UV radiation. We have recognized important advantages in this production method when compared with prior art extrusion techniques. See for example, U.S. Pat. No. 6,324,324.

BRIEF DESCRIPTION OF THE DRAWING

The invention may be more readily understood from the following detailed description of specific embodiments when read in conjunction with the accompanying figures, in which.

DETAILED DESCRIPTION OF THE INVENTION

Figure 1:
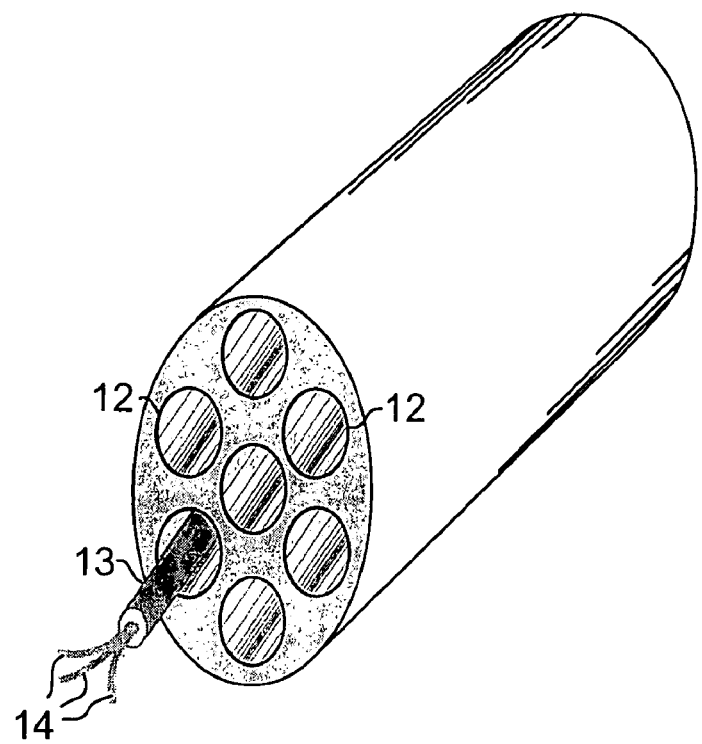
FIG. 1 is a perspective view of a microduct conduit with a single microduct cable installed in one of the microducts of the microduct conduit.
Figure 2:
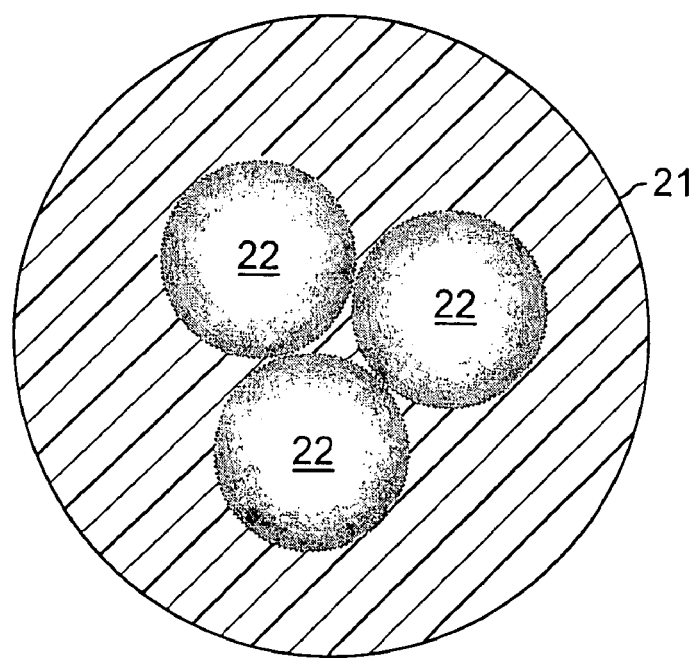
FIG. 2 is an end sectional view of the microduct cable of FIG. 1, which illustrates the elements of the cable in greater detail.

With reference to FIG. 1, a microduct conduit is shown at 11 with a plurality, here seven, of microducts 12. The conduit may take a variety of forms and forms no part of the invention. The microducts are typically relatively rigid plastic tubes, and may be bundled together in whatever quantity desired. The number of microducts is generally chosen to allow for both the current capacity required, plus some ducts that initially remain empty but are reserved for future expansion. The microducts are shown as circular but could have other shapes, for example hexagonal, in a close packed array to resemble a honeycomb. In FIG. 2 the microducts are shown loosely bundled with space between them. In many cases the ducts will be closely packed and assembled tightly together.

FIG. 1 shows one of the microducts occupied by a microduct cable 13. The typical design is for one microduct cable per microduct, although more might be accommodated, especially where the microduct cables are installed in the conventional manner by pulling. Some or all of the remaining ducts may contain microduct cables that are not shown for simplicity.

The microduct cable 13 comprises a plurality, here three, of optical fibers. Again, the choice of the number of optical fibers in the cable depends on a variety of system design factors. Typically, there are 2-24 optical fibers bundled together. In some cases a single fiber may be cabled for installation in a microduct.

With reference to FIG. 2, optical fibers 22 are coated with sheath 21. As is evident the cross section shape of the sheath is round or oval. The sheath is conventionally applied by melt extrusion. According to this invention the sheath is applied as a UV cured coating. UV cured coatings are made by applying a prepolymer to the article being coated and curing the prepolymer with UV light. The prepolymer contains a photoinitiator to promote curing, and articles cured by UV light will show chemical evidence of the photoinitiator.

Figure 3:
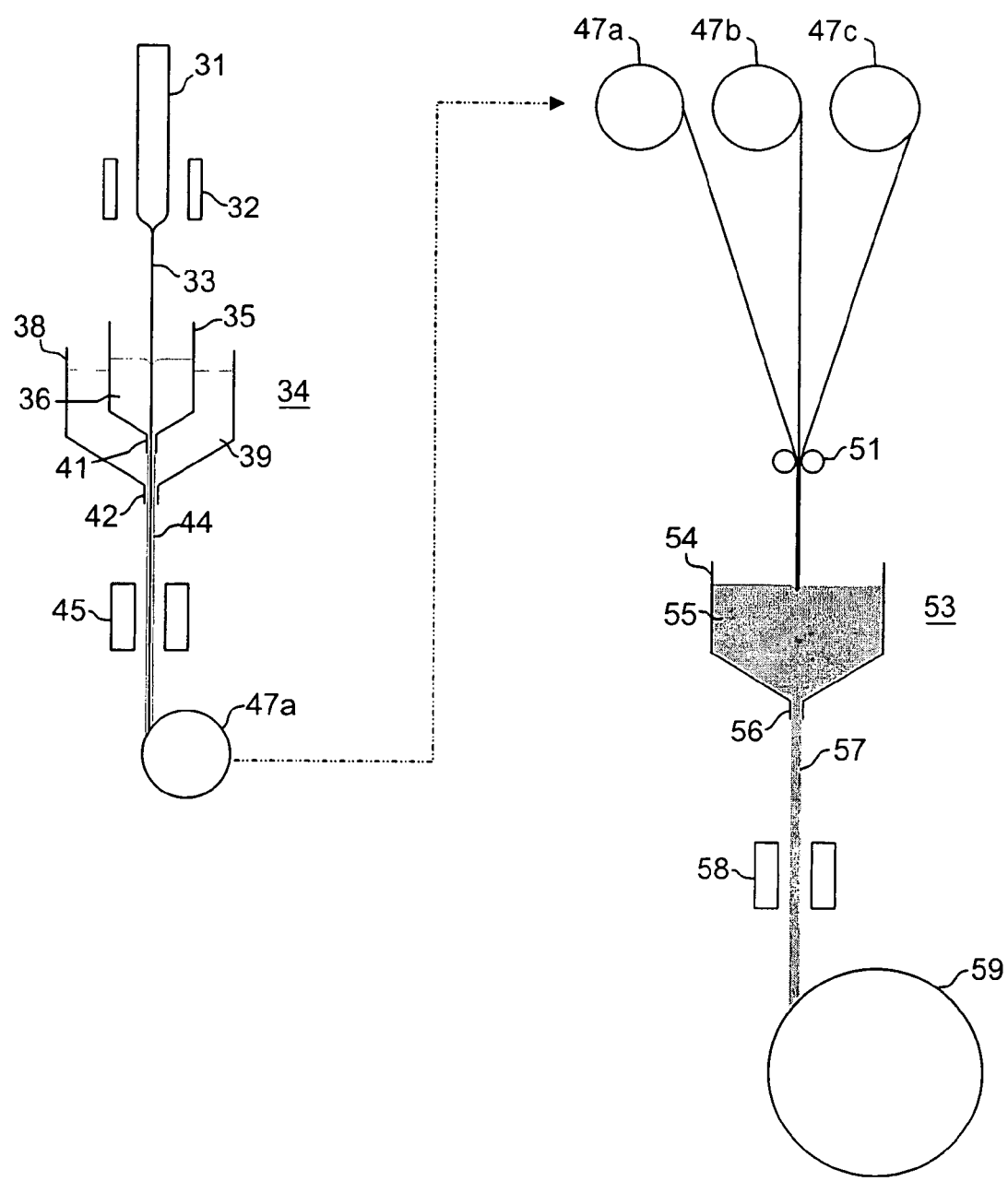
FIG. 3 is a schematic representation of an apparatus for manufacturing the microduct cable of the invention.

The overall manufacturing technique for the microduct cable is illustrated in FIG. 3, where the module to the left represents the conventional dual coating operation for optical fiber, and the module on the right represents the microduct cabling operation. Optical fiber preform 31 is shown with susceptor 32 representing the furnace (not shown) used to soften the glass preform and initiate fiber draw. The drawn fiber is shown at 33. The nascent fiber surface is then passed through dual coating applicator, indicated generally at 34, which has inner chamber 35 containing the primary coating prepolymer 36, and outer chamber 38 containing the secondary coating prepolymer 39. Although the dual cup coating technique is shown, other multiple coating approaches may also be used, such as sequential or tandem applicators. The liquid-coated fiber from the first chamber 35 exits through die 41 and enters the secondary coating chamber with prepolymer 39, then exits from the second coating chamber through die 42. As is well known, the combination of the first and second dies, fiber speed and temperature, and the fluid dynamics of the prepolymers, controls the coating thickness. The prepolymer coated fiber 44 is then exposed to UV lamps 45 to cure the prepolymer and complete the coating process. Other curing radiation may be used where appropriate. The fiber, with the coating cured, is then spooled by take-up reel 47a. The take-up reel controls the draw speed of the fiber. Draw speeds in the range typically of 1-50 m/sec. can be used. It is important that the fiber be centered within the coating cup, and particularly within the exit dies 41 and 42, to maintain concentricity of the fiber and coating. A commercial apparatus typically has pulleys that control the alignment of the fiber. Hydrodynamic pressures in the two die themselves aid in centering the fiber. A stepper motor, controlled by a micro-step indexer (not shown), controls the take-up reel.

The usual fiber coating materials are UV cured polyacrylates. These polymers are sufficiently transparent to UV curing radiation, i.e., wavelengths typically in the range 200-400 nm, to allow full curing at high draw speeds. Other transparent coating materials, such as silicones and vinyl ethers have also been used as UV cured optical fiber coatings. The coating technology using UV curable materials is well developed. Coatings using visible light for curing, i.e. light below 600 nm, may also be used.

In the fiber draw operation, the coating fluid applied to the nascent glass fiber is a prepolymer with a UV photoinitiator constituent. Suitable photoinitiators are known in the art. The amount of photoinitiator varies, but is typically in the range 0.05-3% by weight. In dual coated fibers, typical primary or inner coating materials are soft, low modulus materials such as the aforementioned polyacrylates, silicones, or any of a number of other polymer materials having a relatively low modulus. The usual materials for the second or outer coating are high modulus polymers, typically high modulus versions of the same polymer classes. In commercial practice both materials may be low and high modulus acrylates. The coating thickness typically ranges from 20-100 microns in diameter, with approximately 60 microns standard.

The coated fiber reeled on reel 47a is then cabled together with one or more additional fibers, shown in this figure as three, on reels 47b and 47c. As indicated earlier, a single coated optical fiber may be over-coated at this stage to produce the microduct cable, but typically there will be 2 to x optical fibers where x is generally some even number as high, for example, as 24. They are reeled from reels 47a-47x, and bundled with a spooling arrangement represented here by spools 51. They may loosely bound with ribbon or tape at suitable intervals, or twisted. The multiple fiber bundle is passed through a second coating operation to apply the coating that forms the microduct cable sheath, i.e. 21 in FIG. 2. The second coating operation is represented in FIG. 3 with coating apparatus, shown generally at 53, and comprising container 54, prepolymer 55, and die 56. The coated microduct cable 57 exiting the die is cured with UV radiation from lamps 58 and reeled on take-up reel 59.

As shown, the second coating operation applies a single coating layer. Multiple coatings may also be applied in this stage, in the manner shown to the left of the figure, or other suitable method. In the preferred case, two coatings are applied in this stage, a soft inner coating, and the coating of the invention. The inner coating material may be that described above for the primary coating. The multiple coatings may be applied in a multiple-applicator arrangement, or in tandem at multiple stations.

The coating applicators 35, 38 and 54 are shown open in this schematic, and an open (non-pressurized) cup may be a useful option in a vertical machine. However, in a typical commercial draw apparatus the applicator is closed, with a single opening or entrance die just large enough to allowing passage of the fiber into the applicator. A pressure is maintained in the coating fluid. This pressure, e.g. 5-500 psi, aids in reducing bubble formation in the applied coating. Details of a typical coating applicator assembly are given in U.S. Pat. No. 4,374,161 of Geyling et al.

The improved cable sheath material of the invention contains a micro-particle filler, comprising particles less than 5 microns, and preferably less than 2 microns, in the maximum dimension. The restricted size is imposed so that the particles do not prevent effective UV curing of the prepolymer mixture. Particles with this maximum dimension are small enough to be essentially transparent to the UV radiation used to cure the coating. The particles may be silica, e.g. fumed silica, alumina, or other suitable solid material, or mixtures thereof. They may be spherical, needle-shaped, plate-shaped, etc. In a preferred embodiment, the particles are a specialized form of clay. Natural clays are found in a variety of forms, typically small particles of hydrated aluminum and/or magnesium silicates. The clay filler materials preferred for use in the invention typically comprise nanoclay particles with a plate-like morphology. These and other aspects of this nanoclay material are described in more detail in U.S. Pat. No. 6,415,090, which is incorporated herein by reference.

The preferred particles have a predominant fraction (>50%) with a maximum x-y dimension of 1000 nm, preferably a minimum x-y dimension of 100 nm, and a thickness, z-dimension, of less than 15 nm. In terms of aspect ratio, i.e. maximum length (x- and/or y-) to thickness, a range of 15-2000 is suitable. Particles with this characteristic are referred to herein as platelets. The alignment of the platelets is horizontal with respect to the fiber and the surface of the fiber coating. The platelets align inherently with the mild shear stresses that occur in mixing and applying the coating. The amount of filler should be enough to obtain the desired surface characteristics, but not interfere with the cure process. The individual particles are small enough to be essentially transparent to the cure radiation. However, excessive loading, where platelets align continuously end to end to form a blanket at the coating surface, may prevent adequate curing. Typically, proper loading will be in the range of 1-20% by weight.

The filler material is prepared by dehydrating the particulates, then dispersing them in an organic carrier. The carrier performs the physical function of preventing rehydration of the particles, and also treats the surface of the particles to render the particles compatible with prepolymer liquid in which they are dispersed. A wide variety of organic materials that are compatible with the coating polymers may be used. Acrylate monomers or other prepolymers similar to the coating material itself are suitable. Carriers with polar groups, such as long chain hydrocarbons terminating in an amine group, are recommended. The amine group attaches to the clay particle and prevents rehydration of the particulates.

The following examples are suitable for the practice of the invention.

EXAMPLE 1

An optical fiber coating is prepared by blending 5.0 weight % of Nanomer 1.30E, available from Nanocor, with Borden 9MKU72575, available from Borden Chemical, Inc. The latter is a conventional coating prepolymer comprising multifunctional acrylates, and a UV photoinitiator for UV curing. The filler is dispersed in the prepolymer resin using a medium shear mixer. The resin may be preheated slightly for mixing. The mixed prepolymer is introduced into coating applicator 54 of the apparatus of FIG. 3, and three bundled optical fibers are coated as described earlier. The combination of blending the filler platelets prior to filling the applicator with the hydrodynamic extrusion forces exerted by die 56 aligns the platelets. The cured microduct cable sheath exhibits reduced surface friction.

Figure 4:
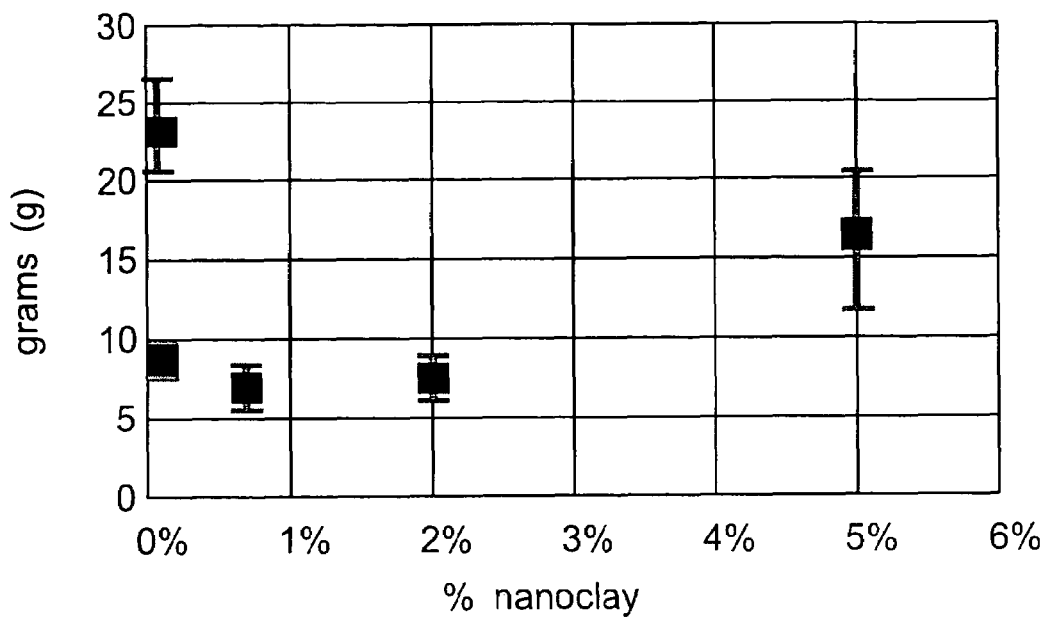
FIG. 4 is a plot of friction in grams vs. % nanoclay content.

Samples of coatings prepared following the general technique above were prepared and measured for a quantitative demonstration of surface roughness. The results are given in FIG. 4, where surface friction in grams g is plotted vs. nanoclay content.

EXAMPLE 2

A microduct cable sheath material is prepared by blending 5.0 weight % of Cloisite 20A, available from Southern Clay Products, with DeSolite 3471-2-136, available from DSM Desotech Inc. Cloisite 20A is a highly hydrophobic clay with platelet clay particles of the nature described above. The filler is dispersed in the prepolymer resin as in the first example, and a bundle of optical fibers coated. The cured microduct cable sheath exhibits reduced surface friction.

Clay filler materials suitable for use with the invention are composed of well known mineral compositions that comprise mainly silicates of aluminum and/or magnesium. Many suitable materials are available commercially from suppliers mentioned in the Examples. A preferred mineral clay is montmorillonite. Hectorite or bentonite, or mixtures of any of these minerals may be used. Synthetic clays with similar structures may also be used. All of these materials comprise particulates that are relatively hard. The main property of interest for the purpose of the invention are the physical characteristics of the materials, i.e. platelike particles, as described earlier, with very small particle size. In defining the particle size, the length is considered the longest dimension of the platelet.

EXAMPLE 3

A microduct cable sheath material is prepared by blending 5.0 weight % of TS-530 fumed silica, available from Cabot Corporation, having essentially spherical particles of less than 2 microns diameter (average 0.3 microns), with Borden 9MKU72575, available from Borden Chemical, Inc. The filler is dispersed in the prepolymer resin as in the first example, and a single optical fiber coated. The optical fiber has previously applied primary and secondary coatings. The cured microduct cable sheath exhibits reduced surface friction.

EXAMPLE 4

A microduct cable sheath material is prepared by blending 5.0 weight % of fumed alumina filler (EX), having essentially spherical particles of less than 2 microns diameter, with DeSolite 3471-2-136, available from DSM Desotech Inc. The filler is dispersed in the prepolymer resin as in the first example, and a bundle of optical fibers coated. The optical fiber has previously applied primary and secondary coatings. The cured microduct cable sheath exhibits reduced surface friction.

EXAMPLE 5

A dual coating sheath is applied to a bundle of optical fibers by coating the bundle sequentially with coating 3287-9-39A, available from DSM Desotech Inc., followed by a particle-containing coating according to the invention. The particle-containing coating is prepared by blending 5.0 weight % of coating 3287-9-75, available from DSM Desotech Inc. This coating has color (yellow) to demonstrate the feature of color coding the sheath. The filler is dispersed in the prepolymer resin as in the first example, and a bundle of optical fibers coated. The cured microduct cable sheath exhibits reduced surface friction.

Figure 5:
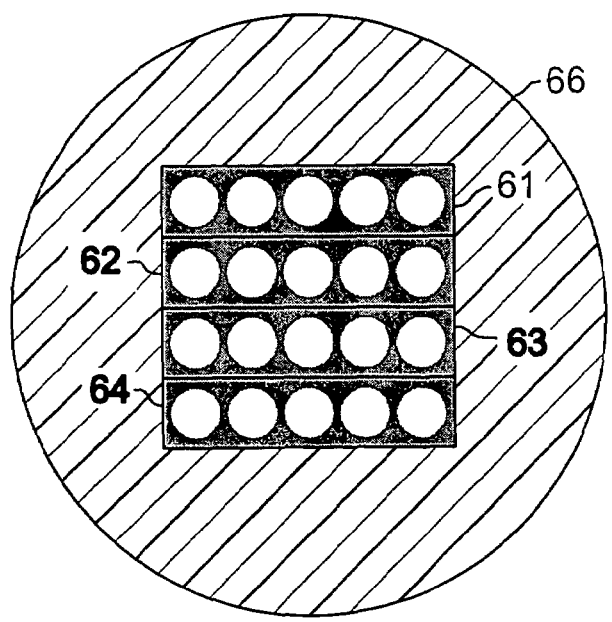
FIG. 5 is a cross sectional view of a microduct cable with stacked ribbons according to the invention.

In the foregoing description and examples the microduct sheath is applied to a bundle of separate optical fibers, or to a single optical fiber. Alternatively, the bundle of fibers may be a coated multi-fiber ribbon. For very high capacity system requirements, one or more fiber ribbons may be stacked as shown in FIG. 5. Here four ribbons, 61-64, of five fibers each are stacked, and then coated, as described above, with sheath 66. The ribbon cabling operation resembles that described in conjunction with FIG. 3 except that the multiple reels contain ribbons.

Although not shown, in each case of applying the sheath, the optical fiber assembly may optionally have a soft, polymer coating applied prior to applying sheath, as described in Example 5 above.

Figure 6:
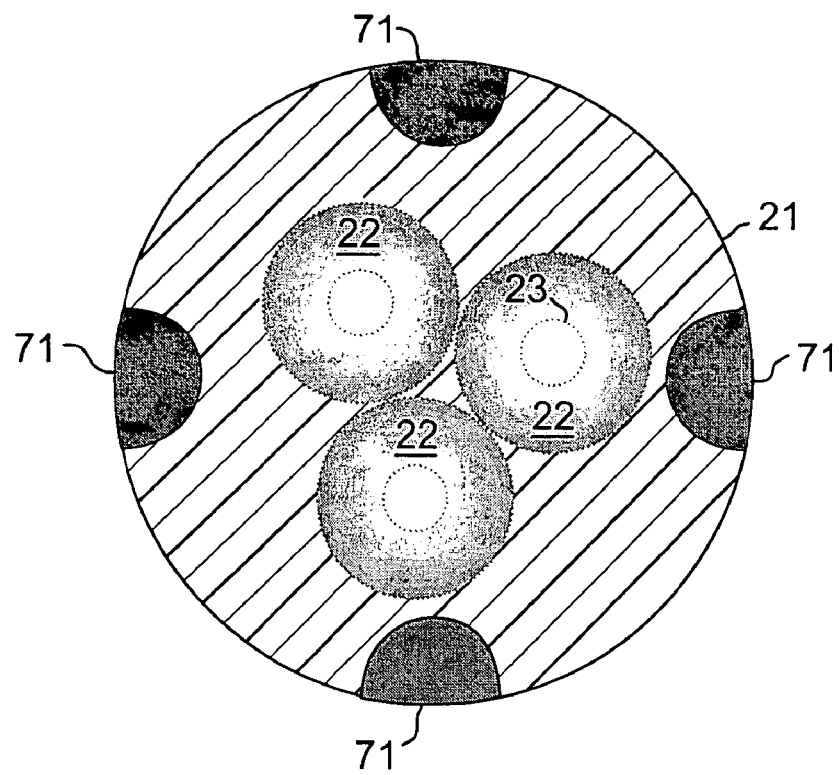
FIGS. 6 and 7 illustrate an alternative embodiment of the invention.
Figure 7:
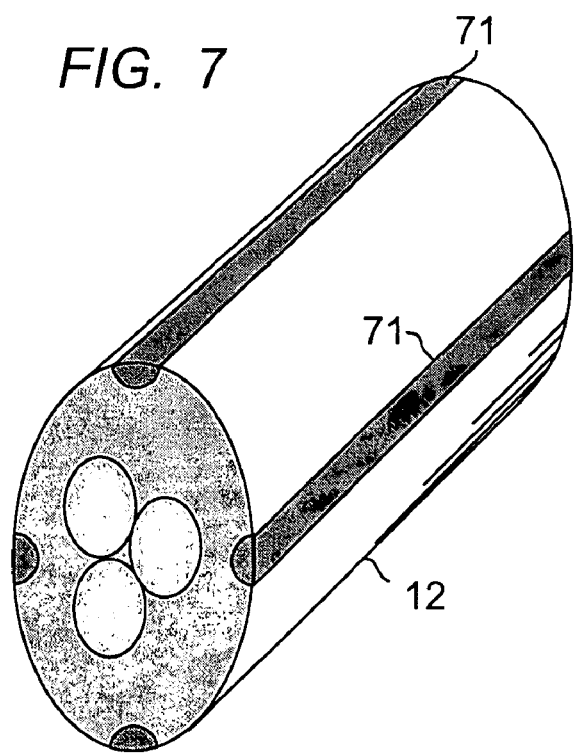

The microduct cable described so far has a sheath or coating wherein the entire sheath material contains the special filler. Recognizing that the objective of the invention is to provide an outer surface with the modified friction characteristics described, it is not essential to fill the entire structure. Accordingly, in an alternative embodiment only the outer surface of the sheath contains filler. For example, a dual coating may be used wherein the primary coating is free of filler and the secondary coating has filler. Yet another approach is illustrated in FIGS. 6 and 7, wherein stripes 71 of filler are formed on the outside of the sheath 21. The stripes of filler may be applied using the techniques described in U.S. Pat. No. 6,317,553, which is incorporated herein by reference.

The term plurality as used herein is intended to mean two or more. The term bundle as used herein for describing the assembly of optical fibers is intended to be generic to the embodiments of FIGS. 2 and 5, i.e. to refer to groups of fibers organized randomly or in a ribbon or other fixed configuration. The microduct cables described above are preferably installed by air blowing the microduct cable through a microduct. Details of this installation method may be found in U.S. Pat. Nos. 4,691,896, 4,796,970, 4,948,097, 5,169,126, 5,645,267, 6,173,107, and 6,328,283, which are incorporated herein by reference. While air blowing is the technique of choice, the microduct cables of the invention may also be hand pulled through the microducts in the conventional manner.

In concluding the detailed description, it should be noted that it will be obvious to those skilled in the art that many variations and modifications may be made to the preferred embodiment without substantial departure from the principles of the present invention. All such variations, modifications and equivalents are intended to be included herein as being within the scope of the present invention, as set forth in the claims.

The invention claimed is:

1. A method for the manufacture of cable comprising:
   (a) assembling together a plurality of optical fibers to form an optical fiber bundle, each of the optical fibers having a polymer coating,
   (b) forming a cable sheath around the optical fiber bundle by the steps of:
      (i) coating the bundle with a coating fluid to form a cable sheath, and
      (ii) exposing the coated bundle to light radiation to cure the coating fluid,
   the invention characterized in that
      the cable sheath has an essentially round cross section,
      the coating fluid comprises:
      (i') a prepolymer, and
      (ii') 1-20% of a solid particle filler, wherein the average particle size of the particles in the solid particle filler is less than 5 microns.

2. The method of claim 1 wherein the solid particle filler comprises particles selected from the group consisting of nanoclay, alumina and silica.

3. The method of claim 2 wherein the particles are clay platelets having an aspect ratio in the range 15-2000 and a maximum average length of less than 1000 nm.

4. The method of claim 3 wherein the clay platelets comprise a mixture of silicates selected from the group consisting of aluminum, magnesium and mixtures thereof.

5. The method of claim 4 wherein the clay platelets have a thickness of less than 15 nm.

6. The method of claim 4 wherein the clay platelets comprise one or more materials selected from the group consisting of montmorillonite, hectorite, benton ite, and synthetic clay.

7. The method of claim 1 wherein the bundle comprises a group of separate optical fibers.

8. The method of claim 1 wherein the bundle comprises optical fiber ribbons.

9. The method of claim 1 wherein the prepolymer comprises a UV curable acrylate.

10. The method of claim 1 wherein the plurality of optical fibers are assembled in at least one optical fiber ribbon, and the optical fiber ribbon has a coating that forms the optical fiber ribbon, and steps (a) and (b) are applied to the optical fiber ribbon.

11. The method of claim 1 wherein the optical fiber bundle is coated with an additional coating prior to or after step (b)(i).

* * * * *